United States Patent [19]

Coltrinari

[11] Patent Number: 5,320,759
[45] Date of Patent: Jun. 14, 1994

[54] SELECTIVE RECOVERY OF HEAVY METALS USING XANTHATES

[75] Inventor: Enzo Coltrinari, Golden, Colo.

[73] Assignee: Hazen Research, Inc., Golden, Colo.

[21] Appl. No.: 897,351

[22] Filed: Jun. 11, 1992

[51] Int. Cl.$^5$ .............................. C02F 1/54; C02F 1/56; C02F 1/62; C02F 1/64

[52] U.S. Cl. ................... 210/705; 210/710; 210/722; 210/724; 210/725; 210/727; 210/728; 210/730; 210/731; 210/912; 210/913; 210/914; 423/43; 423/26; 423/36; 423/37; 423/101; 423/140

[58] Field of Search ............... 210/705, 706, 707, 912, 210/913, 914, 724, 725, 729, 730, 728, 731, 710, 722, 727; 423/42, 87, 89, 101, 140, 43, 26, 36, 37; 209/166, 167

[56] References Cited

U.S. PATENT DOCUMENTS

| | | | |
|---|---|---|---|
| 2,750,254 | 6/1956 | Blake | 209/167 |
| 3,054,746 | 9/1962 | Gaden | 209/166 |
| 3,203,968 | 8/1965 | Sebba | 209/167 |
| 3,800,024 | 3/1974 | Forsell . | |
| 3,947,354 | 3/1976 | Swanson . | |
| 3,979,286 | 9/1976 | Wing | 210/731 |
| 4,018,680 | 4/1977 | Kupfer . | |
| 4,051,316 | 9/1977 | Wing | 210/731 |
| 4,054,516 | 10/1977 | Izumi | 209/167 |
| 4,083,783 | 4/1978 | Wing | 210/731 |
| 4,166,032 | 8/1979 | Hanway | 210/675 |
| 4,238,329 | 12/1980 | Zievers | 210/714 |
| 4,680,126 | 7/1987 | Frankard . | |
| 4,844,873 | 7/1989 | Lebon | 210/705 |
| 4,986,970 | 1/1991 | Haraldsen . | |
| 5,009,793 | 4/1991 | Muller . | |
| 5,102,556 | 4/1992 | Wong . | |
| 5,128,047 | 7/1992 | Stewart | 210/912 |
| 5,160,631 | 11/1992 | Frost . | |
| 5,262,063 | 11/1993 | Yen . | |

FOREIGN PATENT DOCUMENTS

| | | | |
|---|---|---|---|
| 4639544 | 11/1971 | Japan | 210/730 |
| 5009106 | 4/1975 | Japan | 210/705 |

OTHER PUBLICATIONS

Takahashi et al., "A Study on Removal of Cadmium Ion from Mine Water by Flotation Method Utilizing Xanthate as Selective Precipitant," Technology Reports, Tohoku Univ., vol. 36, No. 2, pp. 203-212 (Japan 1971).

Ohyama et al., "Utilization of Xanthate as Selective Precipitant for Nickel and Cobalt Ions," J. Min. Met. Inst. Japan, 78 pp. 391-396 (Japan 1962).

Yamasaki et al., "Utilization of Xanthate as a Selective Precipitant for Nicle and Cobalt Ions, (2nd Report)-Separation of Nickel from Cobalt," J. Min. Met. Inst. Japan, 79, pp. 97-104 (Japan 1963).

"Heavy metal Removal from Wastewater with Starch Xanthate" by R. E. Wing-Proceedings 29th Ind. Waste Conf.-Perdue Univ. (May 1974).

"In Flotation" -F. Sebba pp. 88-89. Elsevier Publishing House-1962.

Chemical Abstracts vol. 76, (1972) 131189k "Removal of Cadmium Ion from Wastewater by a Flotation Method Utilizing Xanthate as a Selective Precipitant".

Primary Examiner—Thomas M. Lithgow
Attorney, Agent, or Firm—Sheridan Ross & McIntosh

[57] ABSTRACT

A process for selectively recovering dissolved heavy metals from a solution is disclosed that involves selectively reacting a xanthate with such dissolved heavy metals. Selective reaction of a xanthate with selected dissolved heavy metals is accomplished by conducting the reaction under conditions such that only some of the heavy metals react with the xanthate, to the exclusion of reaction with other dissolved heavy metals. Selectivity of the reaction is particularly influenced by the pH at which the reaction occurs. Typically, the reaction should occur at a pH below about 4.0. Xanthates, once reacted, can be separated from the heavy metal xanthate reaction product and recycled for use within the process. Purified heavy metal product can be produced if desired.

32 Claims, No Drawings

SELECTIVE RECOVERY OF HEAVY METALS USING XANTHATES

FIELD OF THE INVENTION

The present invention relates to an improved process for selectively recovering dissolved heavy metals from solution.

BACKGROUND OF INVENTION

Liquid streams used in or generated by industrial processes and drainage from mines, waste disposal sites and other industrial sites often contain dissolved heavy metals that are toxic and, if not removed, will be discharged into the environment causing serious pollution problems. Also, many of these heavy metals are of significant commercial value. A need exists to recover these heavy metals to conserve valuable metals and to prevent environmental pollution.

Heavy metals dissolved in waste and drainage liquids are often present in low, yet toxic, concentrations. Current techniques for recovering heavy metals at these low concentrations are either expensive or inefficient. Also, it is difficult to produce purified products of valuable heavy metals following heavy metal recovery techniques that do not allow for selective recovery of heavy metals. Selective recovery of heavy metals is desirable so that revenue from sale of valuable metals recovered can offset the cost of environmental clean-up of waste and drainage liquids and to conserve these valuable metals.

The present invention involves the use of xanthates to selectively recover dissolved heavy metals from liquid streams. Different affinities exhibited by different heavy metals for reacting with xanthated sawdust have been reported by Flynn et al., *Absorption of Heavy Metal Ions by Xanthated Sawdust*, Bureau of Mines Report of Investigating Actions No. 8427, U.S. Department of the Interior (1980). Solubilities of heavy metal xanthates in water are reported in *Encyclopedia of Chemical Technology*, edited by Kirk-Othmer, 3d Edition, Vol. 24, p. 648 (1981), Interscience Publisher, New York, N.Y.

Use of xanthates to recover dissolved heavy metals has been reported. Wing et al., *Removal of Heavy Metals from Industrial Waste Waters Using Insoluble Starch Xanthate*, Environmental Protection Technology Series, PB-283 792, U.S. Environmental Protection Agency (May 1978), discusses the use of an insoluble xanthated starch to recover heavy metals from waste waters generated by a printed circuit industry, lead battery manufacturers, and a brass mill. Flynn et al., *Absorption of Heavy Metal Ions by Xanthated Sawdust*, Bureau of Mines Report of Investigations No. 8427, U.S. Department of the Interior (1980), discusses the use of xanthated sawdust to recover dissolved heavy metals from dilute aqueous solutions, mine-drainage waters, and brines. In contrast to the present invention, however, these references, disclose the use of certain xanthates only as a means for nonselectively recovering dissolved heavy metals. These references do not disclose a process for selectively recovering dissolved heavy metals using xanthates. The value of many heavy metals can be realized only if selective recovery can be achieved. Also, nonselective recovery of all heavy metals is inefficient because some heavy metals may be efficiently removed by less expensive processes.

SUMMARY OF INVENTION

The present invention involves selectively recovering dissolved heavy metals from liquid feed streams in which those selected heavy metals are dissolved. Selectively recovering dissolved heavy metals according to the invention comprises reacting a xanthate with selected dissolved heavy metals under conditions, and particularly with respect to pH, such that reaction of xanthate with nonselected dissolved heavy metals is excluded.

The feed to the process can be any liquid containing dissolved heavy metals. Suitable sources of feed streams are varied, but include leach liquors, drainage from mines or mining operations, drainage from waste disposal or industrial sites, effluent from industrial processes, and brines from extractive industries. In one embodiment of the invention, the feed stream is a leach liquor resulting from leaching of a metal-containing ore or ore deposit, and preferably a leach liquor resulting from heap-leaching of copper ore. In another embodiment, valuable heavy metals, such as cobalt, nickel, and copper are selectively recovered from such copper heap-leach liquors after standard copper recovery techniques.

In one embodiment of the invention, selected dissolved heavy metals are selectively recovered to the exclusion of dissolved iron(II) and/or dissolved zinc. In another embodiment, dissolved iron(III) is reduced to iron(II) prior to reacting a xanthate with selected dissolved heavy metals.

The process of the present invention can be practiced in one or in multiple recovery steps, each involving selectively reacting a xanthate with selected heavy metals. The process of the present invention can also be combined with other heavy metal recovery techniques.

In one embodiment of the invention, a solid heavy metal xanthate reaction product can be physically separated from the feed stream following reaction of xanthate with selected heavy metals. Such solid-liquid separation is by flotation in one preferred embodiment.

Selected heavy metals can be chemically separated from the heavy metal xanthate reaction product, if desired. Individual heavy metals can be concentrated and purified heavy metal products can be produced.

Any xanthate salt capable of reacting with the selected heavy metals can be used in the process of the present invention. However, such xanthates are preferably salts of sodium or potassium, and more preferably salts of sodium. In one embodiment of the invention, xanthates may be recycled in the process for further reaction with dissolved heavy metals following chemical separation of heavy metals from the heavy metal xanthate reaction product.

DETAILED DESCRIPTION OF THE INVENTION

The present invention provides a process for selectively recovering dissolved heavy metals from liquid feed streams in which those heavy metals are dissolved. Xanthates are reacted with dissolved heavy metals in the solution under conditions, particularly with respect to pH, at which some of the dissolved heavy metals react with the xanthate to the exclusion of other dissolved heavy metals. The heavy metals that selectively react with the xanthate, in the form of a heavy metal xanthate reaction product, can then be physically separated from the solution by known solid-liquid separation processes, such as by flotation. Metal values can then be chemically separated from the heavy metal xanthate reaction product by known processes, such as by hydrometallurgical techniques involving solvent extraction followed by electrowinning to produce purified heavy metal products. The unreacted dissolved heavy metals, remaining dissolved in the feed solution, may then be recovered from the solution by subsequent applications of the process of the present invention or by other processes, if recovery of such remaining dissolved heavy metals is desired.

As used herein, the term heavy metals generally refers to metals such as vanadium, chromium, manganese, iron, cobalt, nickel, copper, zinc, arsenic, germanium, molybdenum, gold, cadmium, tin, antinomy, platinum, mercury, lead, bismuth and others, more preferably it refers to iron, cobalt, nickel, copper, zinc, arsenic, germanium, cadmium, antimony, and bismuth, and most preferably it refers to iron, cobalt, nickel, copper, and zinc. Heavy metals generally have a specific gravity in excess of five. Many heavy metals such as lead, mercury, copper, cadmium and others are known to be toxic in low concentrations. Other heavy metals, such as iron and zinc may be toxic at higher concentrations. Many heavy metals, as for example, cobalt, nickel and copper, are of significant commercial value.

Feed streams for the process of the present invention include any liquids containing dissolved heavy metals, preferably aqueous solutions, and more preferably acidic aqueous solutions. Sources of feed streams are varied. Such sources include leach liquors, drainage from mines or mining operations, drainage from waste disposal or industrial sites, effluent from industrial processes involving heavy metals, and brines from extractive industries such as geothermal energy and petroleum production. As used herein, leach liquor refers to any liquid resulting from the treatment of any material with a liquid to dissolve heavy metals present in that material into the liquid in a leaching operation. Leach liquor includes such liquid both before and after a primary or subsequent process for recovering dissolved heavy metals from the leach liquor. The process of the present invention is useful as a primary or as a secondary or other subsidiary heavy metal recovery process.

A preferred feed stream is a leach liquor resulting from leaching of a metal-containing ore or ore deposit, more preferably a leach liquor resulting from heap-leaching of copper ore, and most preferably a leach liquor resulting from heap-leaching of copper ore which leach liquor has already been subjected to standard copper recovery. In a copper heap-leach process, an acidic solution, preferably an aqueous acidic solution, more preferably an aqueous solution of sulfuric acid, nitric acid or hydrochloric acid, and most preferably an aqueous solution of sulfuric acid, is used to leach copper from copper ore. One current industry practice is to treat the resulting leach liquor by standard hydrometallurgical metal recovery techniques, such as by solvent extraction followed by electrowinning, to produce a purified copper product. Another current industry practice is to remove copper from the resulting leach liquor by cementation of metallic copper on iron, which is often added as iron scrap. The cementation product can then be processed using standard pyrometallurgical techniques to produce a purified copper product. Low concentrations of copper, itself a valuable heavy metal, and other heavy metals, some of significant value such as cobalt and nickel, and particularly cobalt, remain dissolved in the leach liquor following such standard copper recovery techniques. The process of the present invention is useful for selectively recovering heavy metals, including valuable copper, nickel, and cobalt, remaining dissolved in such copper heap-leach liquors.

According to the process of the present invention, under appropriate process conditions, xanthates react with some of the heavy metals dissolved in a suitable feed stream, as previously described, to the exclusion of reaction with other dissolved heavy metals, thereby allowing selective recovery of selected heavy metals to the exclusion of nonselected heavy metals. Although total exclusion of any reaction between nonselected dissolved heavy metals and a xanthate is usually preferred, such total exclusion is not necessary according to the process of the present invention. Partial exclusion of nonselected heavy metals is often acceptable, and depending upon the circumstances, may be preferred. Selective recovery of selected dissolved heavy metals according to the process of the present invention is often advantageous even if minor quantities of nonselected dissolved heavy metals also react with the xanthate. An acceptable extent of reaction of nonselected dissolved heavy metals depends on particular conditions, such as the nature of the specific embodiment and economics. Factors such as the relative concentrations of selected and nonselected heavy metals dissolved in the feed stream and the relative amount of xanthate reagent contacted with the feed stream can affect the amount of reaction between a xanthate and nonselected dissolved heavy metals.

Selective reaction of dissolved heavy metals can be accomplished by controlling process parameters, such as temperature, pressure, the relative amount of xanthate reagent contacted with the feed stream, and pH. In a preferred embodiment, selectivity of the reaction is accomplished by controlling the pH of the solution. In another preferred embodiment, the process of the present invention is conducted at ambient temperature and atmospheric pressure.

A preferred embodiment of the present invention comprises selectively reacting a xanthate with heavy metals dissolved in a feed stream at a solution pH such that only selected dissolved heavy metals react with the xanthate. In this embodiment, those heavy metals which react are selectively recovered, to the exclusion of heavy metals that do not react. The proper pH to effect the desired selective recovery reaction can be determined according to disclosures provided herein, or by simple experimentation depending on makeup of the feed stream and the selectivity desired. If the pH of a feed stream is not at the desired reaction pH, then the pH of the stream may be increased or decreased, such as by the addition of base or acid, prior to reacting the xanthate with the heavy metals dissolved in the feed stream. The pH of the feed stream during the reaction can likewise be controlled by adding base or acid. Although the optimum pH for reacting the xanthate with selected heavy metals depends on process conditions and the selectivity desired, the pH of reaction will typically be below about 4.0, preferably below about 3.5, more preferably below about 3.3, and most preferably below about 3.0.

In one embodiment, the process of the present invention comprises contacting the feed stream containing dissolved heavy metals with at least 50%, and preferably in excess of 100%, of the stoichiometric quantity of xanthate relative to the amount of selected dissolved heavy metals assuming complete reaction with such selected dissolved heavy metals. The xanthate is typically of a quantity from about 50% to about 500% of such stoichiometric quantity, and preferably between 100% and 150% of such stoichiometric quantity.

In one embodiment, the process of the present invention comprises selectively recovering dissolved heavy metals in a feed stream, to the exclusion of dissolved iron(II) and/or dissolved zinc. Dissolved iron is frequently present in suitable feed streams, often in high concentrations relative to other dissolved heavy metals, and such dissolved iron can complicate the recovery of other dissolved heavy metals or the subsequent production of purified valuable heavy metal products. Also, dissolved iron can often be effectively removed from feed streams by methods that are less expensive than the process of the present invention. Likewise, dissolved zinc can complicate recovery of other dissolved heavy metals and subsequent production of purified valuable heavy metal products, and is also often recoverable from feed streams by methods that are less expensive than the processes of the present invention. According to this embodiment, heavy metals such as iron(III), copper, cobalt, nickel, bismuth, cadmium, arsenic, silver, gold, mercury and lead are selectively reacted with a xanthate to the exclusion of dissolved iron(II) and/or dissolved zinc. To the extent that dissolved iron is present as iron(II), complications and/or inefficiencies caused by such dissolved iron can be reduced or avoided by recovering other dissolved heavy metals to the exclusion of iron(II). Likewise, complications and/or ineffectiveness caused by dissolved zinc can be reduced or avoided by recovering dissolved heavy metals to the exclusion of zinc. Although the optimum pH for reacting the xanthate with selected heavy metals to effect the desired exclusion of reactions with zinc and/or iron(II) will vary with the composition of the feed solution, the relative amount of xanthate contacted with the feed solution and other process conditions, the reaction between the xanthate and the selected dissolved heavy metals should generally occur at a pH below about 4.0, preferably below about 3.5, more preferably below about 3.3, and most preferably below about 3.0. Although dissolved zinc and iron(II) are often both present in feed solutions, this embodiment can also be used when only one of these constituents is present in the feed stream.

Another embodiment of the invention comprises reducing iron(III) dissolved in the feed stream to iron(II) prior to reacting a xanthate with selected dissolved heavy metals. At low pH values suitable for selective recovery herein, iron(III) has a higher affinity for reacting with xanthates than iron(II). By reducing iron(III) to iron(II), and thereafter reacting a xanthate with selected dissolved heavy metals to the exclusion of iron(II), complications and/or inefficiencies caused by recovering dissolved iron can be limited. Such reduction may be effected using any reducing agent suitable for reducing iron(III) to iron(II), such as, for example, elemental iron or metal sulfides. Metal sulfides used as reductants are preferably sodium, potassium, or calcium sulfides, and more preferably sodium hydrosulfide or calcium sulfide. If the feed stream contains dissolved copper, use of a metal sulfide reductant can also result in the precipitation of copper sulfide. Such precipitation of copper sulfide may be advantageous if copper recovery is desired.

In a preferred embodiment of the invention, feed to the process is a leach liquor from a copper heap-leach process subsequent to traditional recovery of copper from the leach liquor. Preferably, the dissolved heavy metals are present as sulfates. Preferably, dissolved iron(III) is reduced to iron(II) prior to reacting a xanthate with selected dissolved heavy metals, as previously described. Such reduction may be accomplished using any suitable reducing agent as previously described. A xanthate is then reacted with selected dissolved heavy metals under such conditions that the xanthate reacts with dissolved cobalt, nickel and/or copper to the exclusion of zinc and/or iron(II). Although the optimum pH for selectively reacting the xanthate with dissolved heavy metals to effect the desired recovery of cobalt, nickel and copper will vary with the composition of the feed stream, the relative amount of xanthate contacted with the feed stream, and other process conditions, the pH of reaction should generally be below about 4.0, preferably below about 3.5, more preferably below about 3.3, and most preferably below about 3.0.

As used herein, the term xanthate includes all salts wherein the anionic constituent of such salt contains one or more of the xanthate functional group

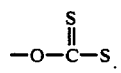

Preferably, the anionic constituent of xanthate is of the general formula

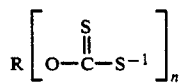

wherein R is any carbon-containing organic radical and n is an integer of one or more indicating the number of xanthate functional groups independently attached directly to R. Preferably R is an alkyl or substituted alkyl, more preferably R is ethyl, propyl, butyl, or pentyl, and even more preferably, R is ethyl. If R is a carbohydrate, a substituted carbohydrate or a carbohydrate derivative, then R is preferably cellulosic (such as with xanthated sawdust), and preferably contains multiple xanthate functional groups. If R is a polymerized carbohydrate (such as a starch), a substituted polymerized carbohydrate, or a derivative of a polymerized carbohydrate, then R preferably contains multiple xanthate functional groups.

Such xanthates are preferably salts of sodium or potassium, more preferably salts of sodium, even more preferably such xanthates are selected from the group consisting of sodium ethylxanthate ($NaC_2H_5OCS_2$), potassium ethylxanthate ($KC_2H_5OCS_2$), xanthated cellulosic fibers (such as, for example, xanthated sawdust), xanthated starches and combinations thereof, and most preferably such xanthates are selected from the group consisting of sodium ethylxanthate, potassium ethylxanthate, and combinations thereof.

Methods for preparing xanthates are known in the art. Xanthates are often unstable and should be used soon enough following preparation to avoid significant degradation. In one embodiment, a xanthate may be prepared on site and used prior to degradation. In a preferred embodiment, sodium ethylxanthate or potassium ethylxanthate is prepared on site and used prior to degradation. For example, sodium ethylxanthate can be prepared from ethanol, sodium hydroxide and carbon disulfide in an aqueous solution according to the following reaction:

$$C_2H_5OH + NaOH + CS_2 \rightarrow NaC_2H_5OCS_2 + H_2O.$$

According to the process of the present invention, when a suitable xanthate, as previously described, reacts with a dissolved heavy metal, a heavy metal xanthate reaction product is formed. For example, in the case of sodium ethylxanthate reacting with dissolved cobalt in a sulfate solution to form a heavy metal xanthate reaction product of cobalt ethylxanthate, the reaction would be as follows:

$$2NaC_2H_5OCS_2 + Co^{+2} + SO_4^{-2} \rightarrow Co(C_2H_5OCS_2)_2 + 2Na^+ + SO_4^{-2}$$

Suitable xanthates, as previously described, can be present in a solid or liquid form prior to contacting the xanthate with a feed solution to effect reaction between a xanthate and selected heavy metals. Suitable xanthates can be either soluble, insoluble or partially soluble in the feed stream containing dissolved heavy metals. Contacting the xanthate and the feed stream to effect selective reaction between the xanthate and dissolved heavy metals can be accomplished using any suitable known contacting technique. In the case of xanthates which are soluble or partially soluble in aqueous solutions, such as, for example, sodium ethylxanthate and potassium ethylxanthate, such contacting may be effected by mixing the xanthate and an aqueous feed stream to cause dissolution of the xanthate into the feed stream. In the case of insoluble xanthates, such as, for example, xanthated sawdust and insoluble xanthated starches, such contacting may be effected by mixing the xanthate and the feed stream or by passing the feed stream through a process vessel, such as a packed tower, containing the insoluble xanthate. Preferably, such contacting should be for a time sufficient to allow the reaction between the xanthate and selected dissolved heavy metals to reach equilibrium. The process of the present invention can be conducted in either a batch or continuous process.

The heavy metal xanthate reaction product will typically be a solid. Such heavy metal xanthate reaction product can be physically separated from the feed stream following reaction by any suitable solid-liquid separation technique known in the art, such as by use of gravity, filtration, cycloning, or flotation. In a preferred embodiment, such solid-liquid separation is by flotation of the heavy metal xanthate reaction product, which is typically hydrophobic.

As noted above, in one embodiment of the invention, the feed solution is a leach liquor. In such an embodiment, subsequent to physical separation of the heavy metal xanthate reaction product from the feed stream, as described above, the resulting solution, free of heavy metal xanthate reaction product, can be recycled to the leaching process to dissolve additional heavy metals from leached materials. Similar recycle processes can also be practiced with other industrial processes involving heavy metals.

In one embodiment of the present invention, dissolved heavy metals are selectively recovered in multiple recovery steps, each involving selectively reacting a xanthate with selected heavy metals. For example, xanthate may be reacted with a first group of selected dissolved heavy metals at one pH to recover the first selected group of dissolved heavy metal constituents. Xanthate may then be reacted with a second group of selected heavy metals in a subsequent step at a different pH to effect recovery of the second selected group of dissolved heavy metal constituents. Additional reactions at additional pH's may be effected as desired.

Another embodiment comprises combining selectively reacting xanthate with selected dissolved heavy metals and other heavy metal recovery techniques. For example, as noted previously, copper dissolved in the feed stream may be precipitated by adding a metal sulfide prior to reacting other heavy metals with a xanthate. Or, for example, following selective recovery of some heavy metals using a xanthate, other heavy metals may be removed by other methods in subsequent processes, such as by precipitating such other heavy metals using hydroxides or carbonates.

Following physical separation of heavy metal xanthate reaction product from a feed stream, the selectively reacted heavy metals can be chemically separated from the heavy metal xanthate reaction product, if desired. One embodiment of the present invention comprises roasting the heavy metal xanthate reaction product in the presence of oxygen to decompose the heavy metal xanthate reaction product, preferably producing oxides of the selectively recovered heavy metals. In another embodiment, the heavy metal xanthate reaction product is reacted with a non-heavy metal sulfide, preferably a sodium or potassium sulfide, more preferably sodium monosulfide or sodium hydrosulfide, and most preferably sodium hydrosulfide, to produce reaction products comprising heavy metal sulfides and a non-heavy metal xanthate, preferably a sodium xanthate or a potassium xanthate, more preferably sodium ethylxanthate or potassium ethylxanthate, and most preferably sodium ethylxanthate. The resulting non-heavy metal xanthate may then be cycled in the process and contacted with a feed stream to selectively react with additional heavy metals. For example, when a heavy metal xanthate reaction product is cobalt ethylxanthate, the reaction with sodium monosulfide to chemically separate the cobalt from the cobalt ethylxanthate, is assumed to be as follows:

$$Co(C_2H_5OCS_2)_2 + Na_2S \rightarrow CoS + 2NaC_2H_5OCS_2.$$

Individual heavy metals can be concentrated and purified heavy metal products produced, if desired, using any suitable known hydrometallurgical technique after chemically separating the heavy metal from the heavy metal xanthate reaction product, as previously described. In one embodiment of the invention, heavy metals that have been chemically separated from the heavy metal xanthate reaction product are dissolved in an acidic aqueous solution, preferably an aqueous sulfuric acid solution. Individual heavy metals can then be concentrated and purified heavy metal products produced by known hydrometallurgical methods. In a preferred embodiment heavy metals comprising copper, cobalt, and nickel are dissolved in an aqueous acid solution, preferably an aqueous sulfuric acid solution, copper is then extracted into an organic solvent, such as di-2-ethylhexyl phosphoric acid (DEHPA). Cobalt is then extracted into a second organic solvent, such as a phosphinic acid, a commercial example of which is Cyanex 272 by American Cyanamid Company. Nickel carbonate is then precipitated using a suitably reactive carbonate, preferably sodium carbonate. In another preferred embodiment, the copper that has been extracted into an organic solvent, as described previously, is then stripped from the organic solvent and subjected to electrowinning to produce a purified copper product. In still another preferred embodiment, cobalt that has been extracted into an organic solvent, as previously described, is then stripped from the organic solvent and subjected to electrowinning to produce a purified cobalt product. Techniques for concentrating and recovering cobalt and nickel products are generally discussed by Jeffers, et al., *Recovery of Cobalt from Spent Copper Leach Solution Using A Continuous Ion Exchange*, Bureau of Mines Report of Investigations 9084, U.S. Department of the Interior; Ritcey, et al., *Development of Solvent Extraction Process for the Separation of Cobalt from Nickel*, Extraction Metallurgy Division, Department of Energy, Mines and Resources (Canada, Nov. 29, 1971); and Ritcey, et al., *Solvent Extraction—Principles and Applications of Metallurgy*, Part II, Elsevier Scientific Publishing Company (1979).

The following examples are provided for the purpose of illustrating the present invention and are not intended to limit the scope of the invention.

EXAMPLE 1

This example illustrates the selective recovery of cobalt, nickel, and copper from a feed solution also containing other heavy metals using varying relative quantities of xanthate reagent. An aqueous feed stream containing dissolved heavy metals as sulfates is prepared containing the following approximate concentrations in grams per liter of heavy metals: 0.035 cobalt, 0.027 nickel, 0.075 copper, 1.55 iron(II), 0.2 zinc, 3 aluminum, 5 magnesium, and 0.02 uranium. The pH of the feed solution is 3.2. Three tests are performed, each using a 50 ml sample of the feed solution. An aqueous solution containing 20 grams per liter of potassium ethylxanthate is prepared. In Test No. 1, the feed solution is treated with 1 ml of the potassium ethylxanthate solution, containing 56% of the stoichiometric quantity of potassium ethylxanthate assuming complete reaction between the xanthate and dissolved cobalt, nickel and copper in the feed solution. In Test No. 2, the feed solution is treated with 2 ml of the potassium ethylxanthate solution, containing 110% of the stoichiometric quantity of potassium ethylxanthate. In Test No. 3, the feed solution is treated with 5 ml of the potassium ethylxanthate solution, containing 280% of the stoichiometric quantity of potassium ethylxanthate. All three tests are conducted at 23° C. and a pH of 3.2. The solutions are mixed for 15 minutes following addition of the potassium ethylxanthate solution to the feed solution. The solutions are filtered to remove the precipitate and then analyzed to determine the concentration of cobalt, nickel, copper, and iron(II) remaining dissolved in the solution following precipitation of the heavy metal xanthate reaction product. Also, the precipitates are examined to qualitatively determine the amounts of heavy metals present.

Results of the three tests are summarized in Table 1. Table 1 shows the selective reactivity of cobalt, nickel and copper at a pH of 3.2 even when potassium ethylxanthate is added in an amount significantly in excess of the stoichiometric quantity required assuming complete reaction with the copper, cobalt, and nickel. Table 1 also indicates that at a pH of 3.2, copper has a greater affinity to react with the xanthate than cobalt, which has a greater affinity than nickel. Dissolved iron(II) and zinc were relatively unreactive even when the xanthate was added in an amount of 280% of that theoretically required for reaction with the dissolved copper, cobalt, and nickel.

TABLE 1

| Test No. | $KC_2H_5OCS_2$ % of Stoichiometric | pH of Reaction | % of Dissolved Heavy Metals Recovered | | | | |
|---|---|---|---|---|---|---|---|
| | | | Co | Ni | Cu | Fe(II) | Zn |
| 1 | 56 | 3.2 | 6 | <10 | 91 | <5 | <10 |
| 2 | 110 | 3.2 | 91 | 63 | 98+ | <5 | <10 |
| 3 | 280 | 3.2 | 97+ | 96+ | 98+ | 6 | minor |

EXAMPLE 2

This example illustrates selective recovery of dissolved copper and arsenic to the exclusion of germanium. In Test No. 4, a 50 ml aqueous sulfate feed solution is prepared containing the following concentrations of heavy metals in grams per liter: 0.20 germanium, 0.20 copper, and 0.10 arsenic(III). The solution is acidified with sulfuric acid to a pH of 1.5. A solution containing 0.40 grams of potassium ethylxanthate dissolved in 10 ml of water is added dropwise to the feed solution while stirring. The pH of the solution is maintained at between 2 and 2.3 by adding 0.5 ml of 10% sulfuric acid solution. The reaction is conducted at a temperature of 22° C. Following precipitation of the heavy metal xanthate reaction product, the solution is filtered to remove the precipitate and then analyzed to determine the concentration of dissolved heavy metals remaining in the solution. Results of Test No. 4 are shown in Table 2.

TABLE 2

| Test No. | pH of Reaction | % of Dissolved Heavy Metals Recovered | | |
|---|---|---|---|---|
| | | Cu | Ge | As |
| 4 | 2-2.3 | 90+ | <5 | 90+ |

EXAMPLE 3

This example illustrates chemical separation of selected heavy metals from a heavy metal xanthate reaction product and reuse of the xanthate to further react with additional selected heavy metals. A 150 ml aqueous feed solution containing dissolved heavy metals as sulfates is prepared containing the following approximate concentration in grams per liter of heavy metals: 0.26 copper, 0.16 cobalt, and 0.097 nickel. Approximately 0.40 grams of potassium ethylxanthate is dissolved in 20 ml of water, which is then added dropwise to the feed solution while stirring. The solution, at a temperature of approximately 23° C., is maintained at pH 2.7 during precipitation. After approximately 10 minutes, the solution is filtered and the precipitate is washed with water. Approximately 39 mg of copper, 23 mg of cobalt, and 11 mg of nickel precipitate from the feed solution. The moist filter cake, weighing approximately 0.7 grams and containing the washed precipitate, is then mixed with 15 ml of an aqueous solution containing 8.6 grams per liter of sodium hydrosulfide. The mixture is then mixed for approximately 35 minutes at a temperature ranging between 40° C. and 53° C. The resulting solids in the mixture are difficult to filter, and therefore approximately one gram of sodium sulfate, 5 mg of a polyacrylamide flocculent (Percol 351), and 5 mg of a polyethylene oxide flocculent (Polyox 301) are added to coagulate the fines. The solution is then filtered, resulting in 28 ml of filtrate.

Approximately 17 ml of the filtrate is then added to and mixed with 90 ml of a second aqueous feed solution containing dissolved heavy metals as sulfates in the following approximate concentrations in grams per liter of heavy metals: 0.26 copper, 0.16 cobalt, and 0.097 nickel. The resulting solution is then mixed for 10 minutes at a temperature of approximately 23° C. The solution pH is maintained between 2.7 and 3.1 during precipitation. The solution is then filtered and the precipitate washed with water. Approximately 23 mg of copper, 7.1 mg of cobalt, and 0.8 mg of nickel precipitate from the second feed solution.

While various embodiments of the present invention have been described in detail, it is apparent that modifications of these embodiments will occur to those skilled in the art. However, it is to be expressly understood that such modifications and adaptions are within the scope of the present invention, as set forth in the following claims.

I claim:

1. A process for selectively recovering first heavy metals comprising heavy metals selected from the group consisting of arsenic, bismuth, antimony, lead and mixtures thereof from a solution in which said first heavy metals are dissolved, said solution also having second heavy metals dissolved therein, said second heavy metals being different than said first heavy metals, the process comprising reacting a xanthate with at least a portion of said dissolved first heavy metals to form a reaction product at a pH of said solution at which reaction of said dissolved second heavy metals with said xanthate is excluded, and selectively separating and recovering at least a portion of said reaction product from said solution containing said dissolved second heavy metal following said step of reacting.

2. The process of claim 1, wherein said solution comprises an acidic aqueous solution.

3. The process of claim 1, wherein said pH of said solution is below about 4.0.

4. The process of claim 1, wherein said pH of said solution is below about 3.5.

5. The process of claim 1, wherein said pH of said solution is below about 3.0.

6. The process of claim 1, wherein said dissolved second heavy metals comprise heavy metals selected from the group consisting of iron(II), zinc and combinations thereof.

7. The process of claim 1, wherein said xanthate is selected from the group consisting of sodium xanthate, potassium xanthate and combinations thereof.

8. The process of claim 7, wherein said sodium xanthate comprises sodium ethylxanthate and said potassium xanthate comprises potassium ethylxanthate.

9. The process of claim 8, further comprising preparing said xanthate from reactants comprising ethanol, a carbon sulfide, and a third reactant selected from the group consisting of sodium hydroxide, potassium hydroxide and combinations thereof and reacting said xanthate with said dissolved first heavy metals before degradation of said xanthate.

10. The process of claim 1, wherein said dissolved second heavy metals comprise dissolved iron(III), and further comprising reducing at least a port of said dissolved iron(III) to dissolved iron(II) prior to reacting said xanthate with said dissolved first heavy metals.

11. The process of claim 10, further comprising reducing said iron(III) to iron(II) by contacting said solution with a reducing agent selected from the group consisting of elemental iron, calcium sulfide, sodium hydrosulfide and combinations thereof.

12. The process of claim 1, wherein at least a portion of said dissolved first heavy metals and said dissolved second heavy metals are in the form of sulfates in said solution.

13. The process of claim 1, wherein said solution comprises dissolved copper, and further comprising recovering at least a portion of said copper from said solution prior to said reacting of said xanthate with said dissolved first heavy metals.

14. The process of claim 13, wherein said step of recovering said portion of said copper comprises reacting said copper with a reactant selected from the group consisting of calcium sulfide, sodium hydrosulfide and combinations thereof.

15. The process of claim 1, wherein said reaction product is a precipitate.

16. The process of claim 1, wherein said solution is selected from a group consisting of drainage, leach liquors and combinations thereof.

17. The process of claim 1, wherein said selectively separating and recovering comprises physically separating at least a portion of said reaction product from said solution by means of flotation.

18. The process of claim 1, further comprising dissolving at least a portion of first heavy metals present in said reaction product in a second solution wherein first heavy metals from said dissolved reaction product are in the form of sulfates in said second solution.

19. The process of claim 18, further comprising selectively extracting from said second solution at least a portion of said first heavy metals dissolved in said second solution into an organic solvent, stripping said extracted first heavy metals from said organic solvent, and subjecting said stripped first heavy metals to electrowinning to produce a purified product of at least a portion of said stripped first heavy metals.

20. The process of claim 1, further comprising roasting in the presence of oxygen at least a portion of said reaction product.

21. The process of claim 1, further comprising reacting at least a portion of said reaction product with a metal sulfide.

22. The process of claim 21, wherein said metal sulfide comprises a sulfide of sodium.

23. The process of claim 22, wherein said sulfide of sodium comprises sodium hydrosulfide.

24. The process of claim 1, wherein said xanthate comprises a product of chemically separating at least a portion of first heavy metals from said reaction product.

25. A process for selectively recovering heavy metals from a solution in which first heavy metals are dissolved, said first heavy metals comprise heavy metals selected from the group consisting of arsenic, bismuth, antimony, lead and combinations thereof, said solution also having second heavy metals dissolved therein, said second heavy metals being different than said first heavy metals, the process comprising reacting a xanthate with at least a portion of said dissolved first heavy metals to form a reaction product at a pH of said solution at which reaction of said second dissolved heavy metals with said xanthate is excluded, and selectively separating and recovering at least a portion of said reaction product from said solution containing said second heavy metal dissolved therein following said step of reacting.

26. The process of claim 25, wherein said solution comprises an acidic aqueous solution.

27. The process of claim 25, wherein said pH of said solution is below about 4.0.

28. The process of claim 25, wherein said pH of said solution is below about 3.5.

29. The process of claim 25, wherein said pH of said solution is below about 3.0.

30. The process of claim 25, wherein said second heavy metals comprise heavy metals selected from the group consisting of iron(II), zinc and combinations thereof.

31. The process of claim 25, wherein said xanthate is selected from the group consisting of sodium xanthate, potassium xanthate and combinations thereof.

32. The process of claim 31, wherein said sodium xanthate comprises sodium ethylxanthate and said potassium xanthate comprises potassium ethylxanthate.

* * * * *